United States Patent [19]
Walter

[11] Patent Number: 5,267,681
[45] Date of Patent: Dec. 7, 1993

[54] UTILITY RACK ANCHOR

[75] Inventor: Richard J. Walter, Westlake Village, Calif.

[73] Assignee: Ski Tote, U.S.A., Camarillo, Calif.

[21] Appl. No.: 828,197

[22] Filed: Jan. 30, 1992

[51] Int. Cl.$^5$ .............................................. B60R 9/058
[52] U.S. Cl. ................................... 224/329; 24/703.1; 156/307.1; 156/307.7; 224/331
[58] Field of Search ............... 24/304, 703.1, 265 EE; 428/542.8, 245; 224/329, 330, 331; 264/339, 295; 156/305, 307.1, 307.7, 310, 322

[56] References Cited

U.S. PATENT DOCUMENTS

| | | | |
|---|---|---|---|
| 2,196,341 | 4/1940 | Rush | 224/29 |
| 2,833,453 | 5/1958 | Barreca | 224/42.1 |
| 2,965,424 | 12/1960 | Baney | 224/329 X |
| 3,239,115 | 3/1966 | Bott et al. | 224/42.1 |
| 3,601,294 | 8/1971 | Gjesdahl | 224/42.1 |
| 3,638,844 | 2/1972 | Bronson | 224/42.1 |
| 3,719,297 | 3/1973 | Nowicki | 214/450 |
| 4,093,683 | 6/1978 | Harley | 264/339 X |
| 4,101,501 | 7/1978 | Hinterwaldner | 428/321.5 X |
| 4,108,342 | 8/1978 | Riva | 224/42.01 |
| 4,253,594 | 3/1981 | Parks | 224/318 |
| 4,627,559 | 12/1986 | Andrsson | 224/329 |
| 4,726,499 | 2/1988 | Hoerner | 224/314 |
| 4,728,019 | 3/1988 | Olliges | 224/329 |
| 4,732,636 | 3/1988 | Varker | 156/307.1 X |
| 4,765,521 | 8/1988 | Finnegan | 224/315 |
| 4,793,535 | 12/1988 | Johnson | 224/329 |
| 4,984,726 | 1/1991 | Marshall | 224/331 |
| 4,995,538 | 2/1991 | Marengo | 224/329 |
| 5,133,816 | 7/1992 | Mills et al. | 156/307.1 X |

FOREIGN PATENT DOCUMENTS

| | | | |
|---|---|---|---|
| 3032099 | 4/1982 | Fed. Rep. of Germany | 224/329 |
| 2221664 | 2/1990 | United Kingdom | 224/329 |

*Primary Examiner*—Allan N. Shoap
*Assistant Examiner*—Christopher McDonald
*Attorney, Agent, or Firm*—Denton L. Anderson

[57] ABSTRACT

An anchor for detachably securing utility racks to vehicles is provided. A plate made of a strong and flexible material such as stainless steel, aluminum, or synthetic aromatic polyamide is slotted on one end or otherwise provided with means for attachment to the utility rack. A substantial part of the plate is surrounded by fiberglass cloth sheeting contained within a cushioning neoprene envelope and an intermediate polyethylene resin barrier. A thin cushioning layer of neoprene rubber envelops the plate, fiberglass cloth sheeting and polyethylene barrier. Activated resin is introduced into the fiberglass cloth sheeting or a hardening material already in the fiberglass sheeting is activated. The activated resin in the anchor is allowed to harden while the anchor is in a configuration which conforms to an anchor site between a door and a jamb of the vehicle, or at some other location on the vehicle. A permanent, hardened, custom-fitted, and cushioned anchor is provided.

43 Claims, 5 Drawing Sheets

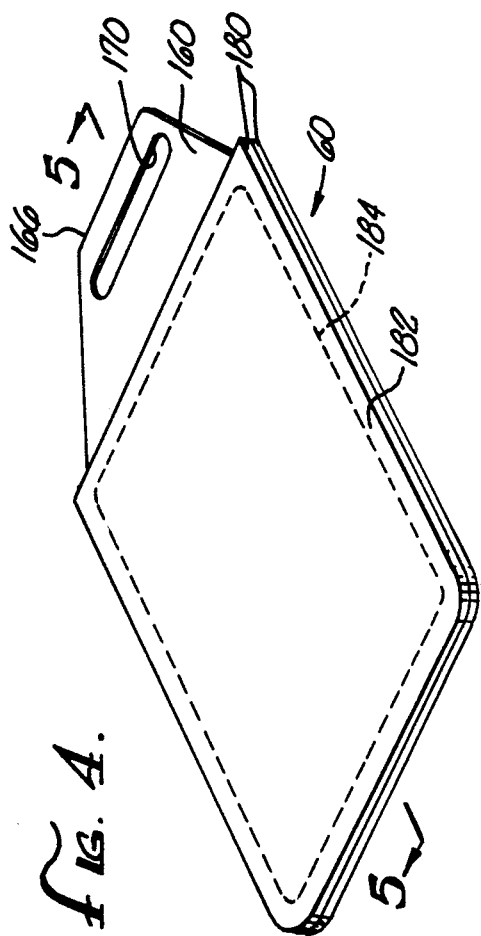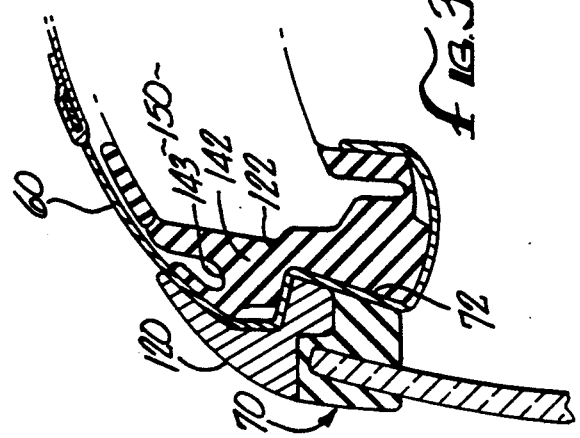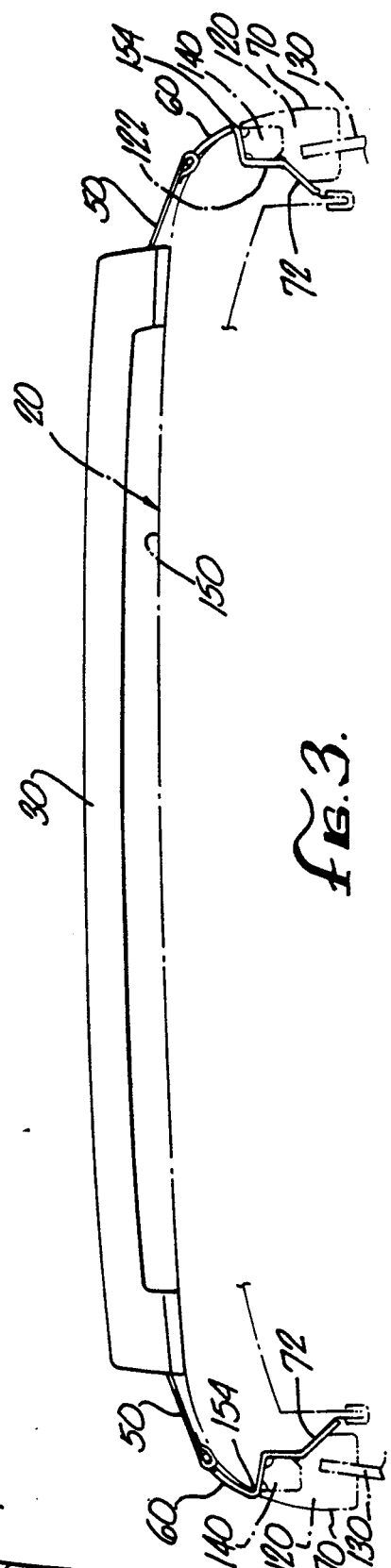

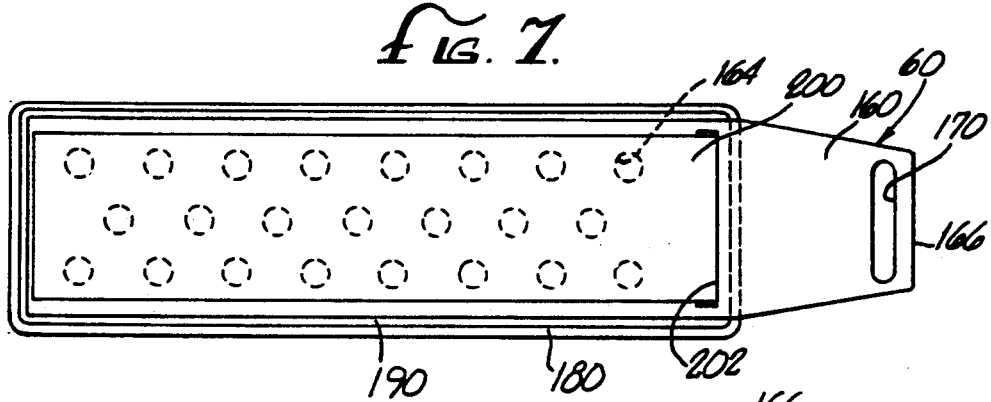
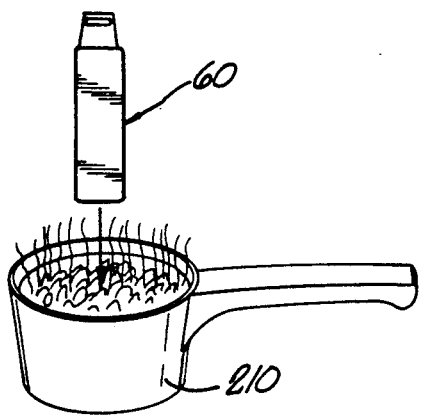
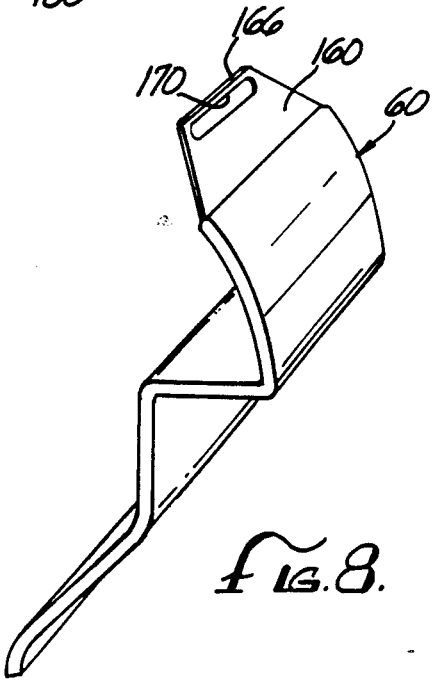
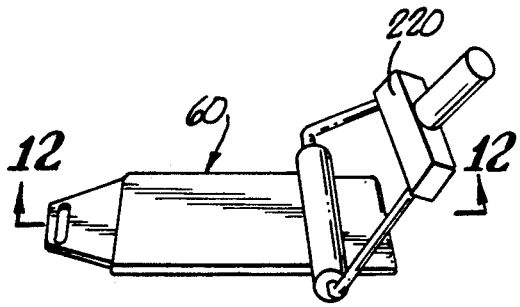
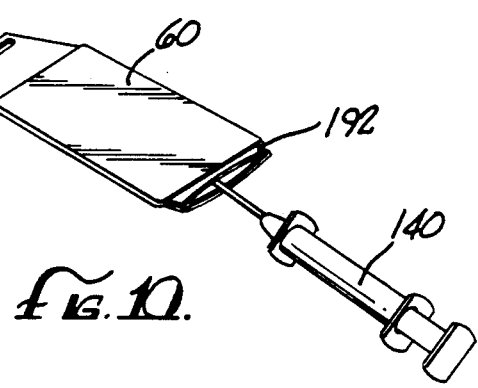

UTILITY RACK ANCHOR

BACKGROUND

The present invention relates to devices for securing objects such as utility racks to structures such as vehicles.

Carrying devices are often attached to the exteriors of vehicles for carrying large, bulky, or otherwise awkward objects. Examples of such objects include canoes, kayaks, surf boards, skis and poles, toboggans, snow boards, wheelchairs, bicycles, clam-shell containers for loose objects, and the like. These objects are lashed, clamped, or otherwise affixed to the carrying devices.

Common means of carrying bulky objects include racks, such as utility racks, which are mounted on the roof, side, trunk or bumper of the vehicle. Typically, these racks are removable; i.e., they are not permanently mounted on the vehicle. Vehicles usually do not have any special permanent attachment points or other devices to which a rack may be secured. In fact, owners of vehicles generally do not prefer permanent attachment points or devices because such devices detract from the vehicle's appearance when the rack is removed from the vehicle.

Roof racks are typically releasably attached by hooks or clamps to rain gutters near the edges of the vehicle roof, instead of to permanent attachment points. However, many modern vehicles employ streamlined "Aero Doors" which eliminate the rain gutters commonly found in earlier vehicles. These vehicle designs remove a convenient attachment point. As a result, specially shaped hooks which fit over the edge of the roof of the vehicle and in between the door jamb and the door of the vehicle have been developed. However, many hooks having different sizes and shapes must be provided because of the large variety of vehicle designs. Vehicle designs also change from year to year. Wholesalers and retailers thus have to maintain a large inventory of different kinds of hooks which is updated annually. This usually results in high administrative and engineering costs, and in substantial quantities of unmarketable excess inventory in various kinds of obsolete hooks.

Carriers or racks can also be attached to the trunks of vehicles. These kinds of racks typically carry wheelchairs or bicycles. Their lower position with respect to the ground makes these carriers much more convenient for persons without considerable upper body strength. Such carriers are usually anchored by at least one hook that fits around the edge of the trunk lid. Naturally, the hook must conform to the particular design of the vehicle trunk lid.

A concern of many vehicle owners is that the hooks not scratch the paint finish of the roof, trunk lids, side or bumper of the vehicle. In addition, an installed hook should not allow rain water to leak past the trunk lid or door of the vehicle. The hooks should also be tough enough to be good anchors and to offer theft resistance.

Accordingly, a need exists for a detachable anchor for attachment to structures such as vehicles which: (1) has sufficient strength to secure the carrying device to the vehicle for objects of varying loads; (2) can conform to various shapes of anchor sites on vehicles such as door jambs or the edges of trunk lids; (3) is nondestructive to the vehicle; (4) is streamlined and does not leak water under wet weather conditions; (5) is easily removed from or attached to the vehicle; (6) is inexpensive to manufacture; (7) is easily attachable to a utility rack or other carrying exists for a "universal" anchor that fits a wide variety of vehicle configurations.

SUMMARY

The above-identified needs are met by the present invention. The invention is an anchor for detachably securing utility racks to structures such as vehicles. The anchor comprises a plate which is initially flexible to conform to a desired anchor site, and then subsequently becomes rigid or hardens to retain the shape of the anchor site.

An anchor according to the invention comprises a plate that is conformable from a first configuration into an anchoring configuration which fits snugly into the anchor site. The anchor has attaching means for attaching the utility rack to the anchor, and rigidifying means for PATENT rendering the anchor substantially rigid and non-pliable in its anchoring configuration.

The rigidifying means can comprise an absorbent layer for receiving hardening material to make the plate rigid. The plate can comprise a plurality of perforated sheets. The perforations allow the hardening material to pass through the plate to better permeate the absorbent layer.

The anchor can have a layer of cushioning material adjacent the vehicle to protect against vehicle damage. It can also have a protective layer between the absorbent layer and the cushioning layer to prevent the hardening material from chemically reacting with the cushioning layer.

The rigidifying means can further comprise pre-placed hardening material permeating the absorbent layer and a burstable bladder containing a curing agent adjacent the absorbent layer. When the bladder bursts and the curing agent is released into contact with the hardening material, the anchor becomes rigid. An alternative rigidifying means comprises an opening in the anchor for receiving an injection instrument which injects activated hardening material into the anchor through the opening to permeate and harden the absorbent layer.

The attaching means can comprise a slot formed in the plate. If the utility rack is attached to the anchor by a strap, the strap can be connected to the anchor by passing the strap through the slot.

An anchor according to the present invention is installed by conforming the anchor from its initial pliable configuration into an anchoring configuration which fits snugly into the anchor site. The anchor is then hardened by injecting activated hardening material into the anchor while the anchor is in its anchoring configuration, or by bursting a bladder filled with the catalyst hardening chemical to mix it with the hardenable material to form the hardening material. The anchor can also be hardened by exposing a suitable hardening material to heat or ultra violet light. The anchor then becomes substantially rigid and non-pliable in its anchoring configuration.

Important features of the invention have been outlined very broadly. Additional features of the invention will be set forth below.

DRAWINGS

These and other features, aspects, and advantages of the present invention will become better understood with reference to the following description, appended claims, and accompanying drawings where:

FIG. 3 is a plan view of a utility rack mounted on the roof of an automobile (shown in phantom) and attached to anchors constructed according to the embodiment of the invention shown in FIG. 1;

FIG. 3A is a vertical cross-section of an anchor constructed according to the embodiment of the invention shown in FIG. 1 attached to the roof of an automobile of the type having "Aero Doors";

FIG. 4 is a perspective view of an anchor constructed according to an embodiment of the invention shown in FIG. 1;

FIG. 7 is a cross-sectional view of the anchor shown in FIG. 4 taken along line 7—7 in FIG. 5;

FIG. 8 is a perspective view of a hardened anchor according to the embodiment of the invention shown in FIG. 4;

FIG. 9 is a perspective view showing one means for hardening an anchor such as the anchors shown in FIGS. 1 and 2;

FIG. 10 is another perspective view showing an alternate means of hardening an anchor such as the anchors shown in FIGS. 1 and 2;

FIG. 11 is a perspective view showing a third means for hardening an anchor such as the anchors shown in FIGS. 1 and 2.

DESCRIPTION

Figure 1:
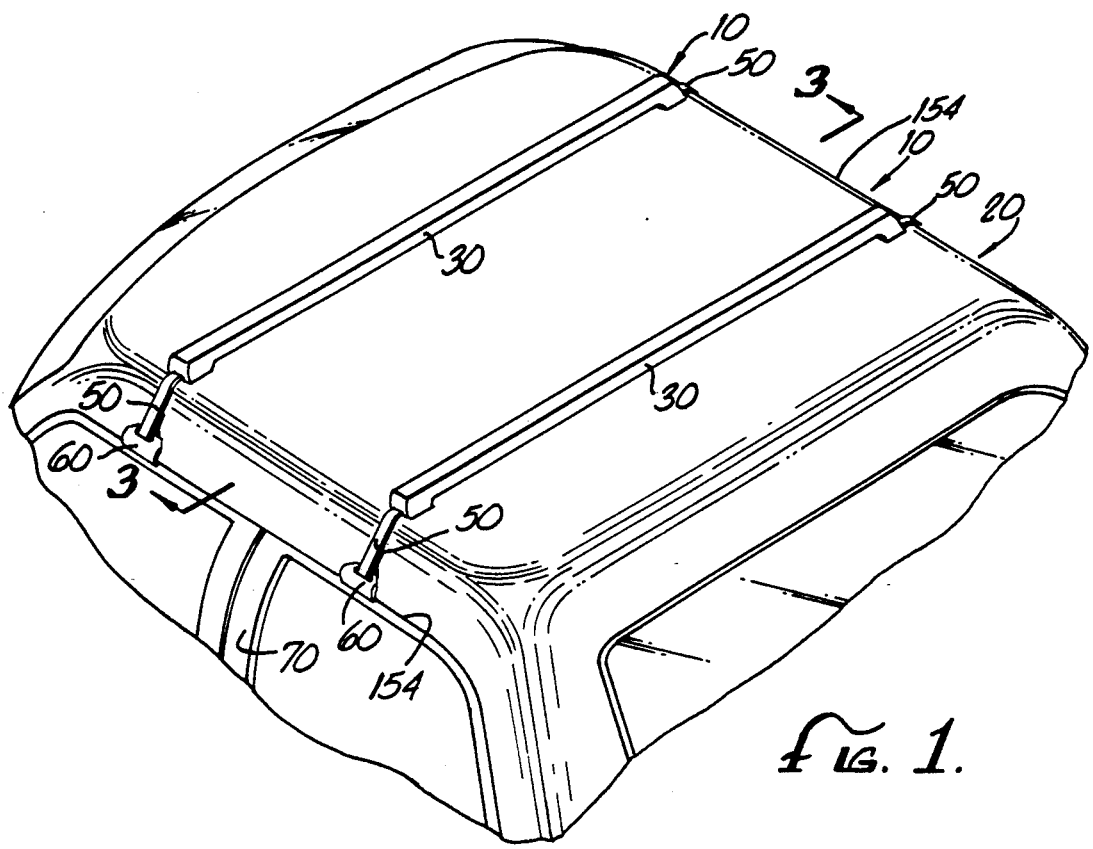
FIG. 1 is a perspective view of the roof of a vehicle on which is mounted two utility racks attached to anchors constructed according to one embodiment of the invention.

Referring now to FIG. 1 in the drawings, two utility racks 10 are attached to the roof 150 of a vehicle 20. Each utility rack 10 has a carrier bar 30 extending substantially across the roof 150 of the vehicle 20. The vehicle 20 can be an automobile, truck, watercraft, aircraft or the like, although the description below will be given in the context of the automobile 20 shown in the drawings (particularly FIGS. 1 and 2). Indeed, this invention permits the attachment of utility racks to almost any structure having access means for opening and closing the structure, such as a door, hatch or trunk lid. A "utility rack" generally is any device used for supporting objects on such a structure.

Straps 50 secure the carrier bars 30 to anchors 60. The straps 50 are preferably constructed of a flexible but tough and difficult to cut material such as webbing made of an aromatic polyamide fiber (such as KEVLAR ® aromatic polyamide fiber available from DuPont de Nemours and Co.), stainless steel strips, aluminum alloy strips or the like. The anchors 60 wrap around and gain a purchase on the rim 154 of the roof 150 of the vehicle 20.

The anchors 60 are initially flexible strips which fit between doors 70 and the corresponding door jambs 72 of the vehicle and are hardened in place, as described below.

Figure 2:
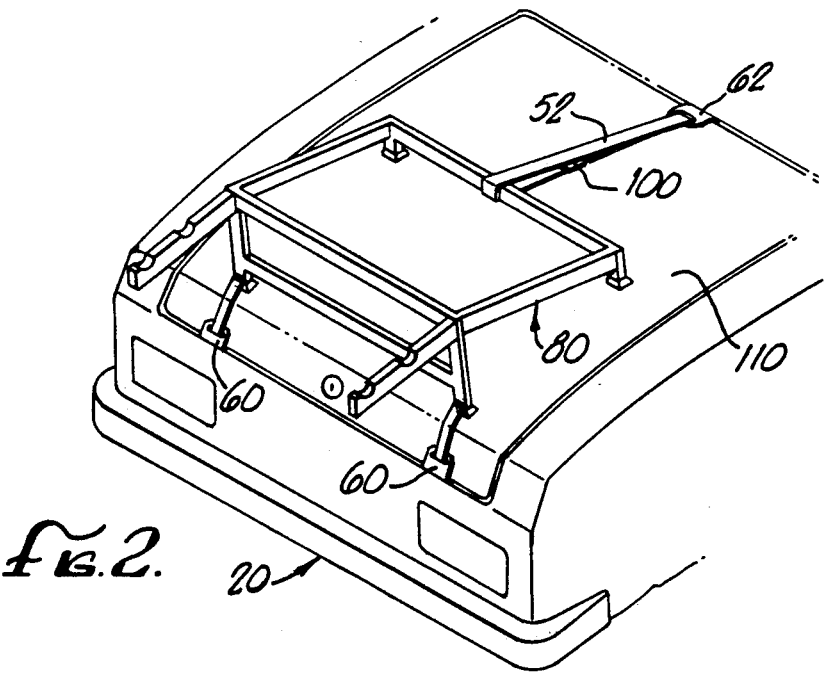
FIG. 2 is a perspective view of the rear portion of an automobile with a bicycle carrier held in position by straps attached to anchors constructed according to a second embodiment of the invention.

FIG. 2 shows another application of an embodiment of the invention. A bicycle rack 80 rests on the trunk lid 110 of an automobile. The bicycle rack 80 is secured by the straps 52 to the anchors 62. The anchors 60 bend around the edge of the trunk lid 110 and therefore fit between the trunk lid 110 and a seat (not shown) for the trunk lid 110. A tightener 100 shortens one of the straps 52 in order to hold the bicycle rack 80 in place against the trunk lid 110.

FIG. 3 shows the utility rack 10 in position on the roof 150 of the vehicle 20. The vehicle 20 is shown in phantom. The anchors 60, after being hardened in place, conform to the shape of the juncture between the door jamb 122 on the one side and the door frame 120 and the door seal 140 on the other side. The snug fit of the anchors 60 to the door frame 120 provides a secure attachment to the vehicle. In addition, the anchors 60 are sufficiently thin to not interfere with the functioning of the seal 140 or the door frame 120, and do not cause leaks of water under wet weather conditions or wind noises. The anchors 60 are also easily removed from the vehicle when the doors are opened and the tension in the straps 50 is released.

FIG. 3A shows how the anchor 60 is mounted on a vehicle having "Aero Doors." Such vehicles do not have external rain gutters; instead, a soft elastic seal 142 containing a trough 143 is attached to the door jamb 122 of the vehicle 20. The door 70 fits against the seal 142. The trough 143 in the seal 142 carries rain water away from the door 70.

The anchor 60 conforms to the seal 142 and wraps far enough around the door jamb 122 to gain a solid purchase, even though the anchor 60 does not touch any solid parts of the roof 150 or the door jamb 122.

Figure 5:
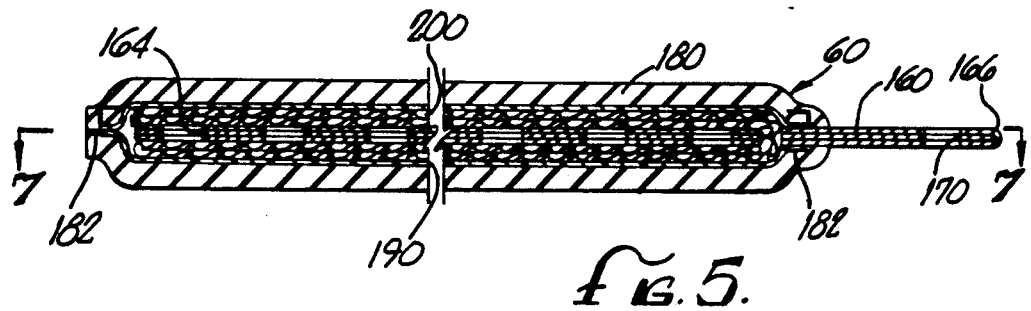
FIG. 5 is a cross-sectional view of the anchor shown in FIG. 4 taken along line 5—5 in FIG. 4.
Figure 6:
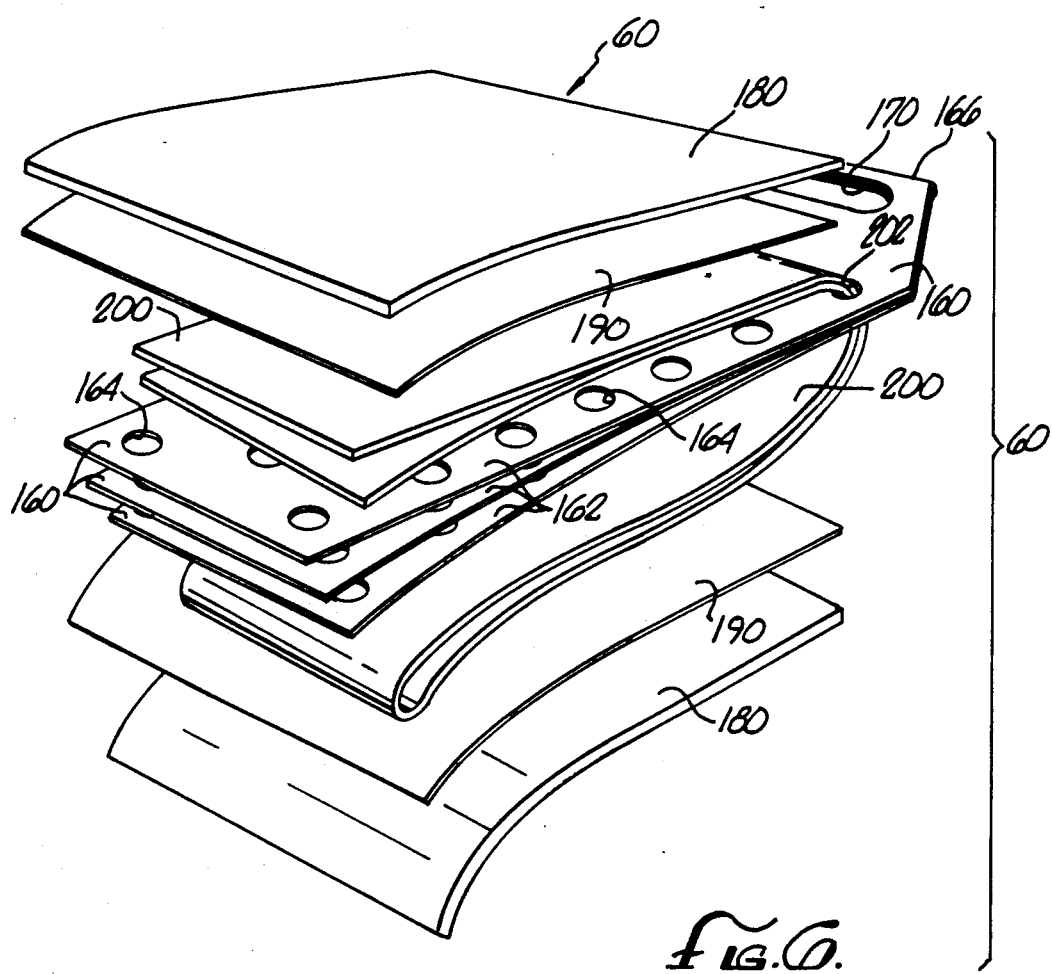
FIG. 6 is an exploded view of the anchor shown in FIG. 4.

FIG. 4 is a perspective view of an anchor of the embodiment of the invention shown in FIG. 1. FIGS. 5, 6, and 7 show details of its construction. A flexible plate 160 is formed from at least two plate sheets 162 of strong and flexible material such as KEVLAR ® aromatic polyamide fiber webbing, soft aluminum alloy, brass shim stock, or flexible stainless steel. Two or more sheets are provided in this embodiment of the invention in order to provide the resulting laminated structure with sufficient strength to secure the anchor to the vehicle when the anchor 60 is hardened into its final shape. In some applications, a single plate sheet, or even the absence of a plate sheet, can work where the plate and/or the hardening agent in the anchor 60 provide sufficient rigidity. A generally rectangular slot 170 perforates a first end 166 of the flexible plate 160 in order to provide a means for attachment to the strap 50, which is connected in turn to the utility rack 30. The straps 50 also can be attached to the flexible plate 160 by D-rings, rivets, hooks, and the like. The flexible plate 160 can be formed as an integral extension of a strap 50, in which case the strap 50 is inherently attached to the flexible plate 160.

Most of the flexible plate 160 is sandwiched in two cushion sheets 180 in order to protect the anchor site from damage and to cooperate with vehicle door and hatch seals, as described below. The cushion sheets 180 are preferably formed of a soft and resilient cushioning material, such as neoprene synthetic elastomer. This material is usually available in stores carrying marine products because it is often used in patching rubber wet suits. Other acceptable materials for the cushion sheets include soft synthetic or natural rubber or similar material. The desired properties for a cushion sheet material are abrasion resistance, water tightness, flexibility, and the ability to easily conform to a variety of shapes.

The cushion sheets 180 are sealed to each other or to the flexible plate 160 to form a cushioning layer around the anchor. The region of the seal in FIG. 4 is indicated by reference numeral 182 and the interior boundary of the seal is indicated by reference numeral 184. The seal is formed by the use of an adhesive, such as rubber cement available at many hardware stores under the trademark SUPER 77 from 3M Company in Minneapolis, Minn. Other rubber cements sold under the 3M trademark by the 3M Company can also be used. It is also possible to form an appropriate seal by a heating process which melts the sheets 180 together, but this method is usually more expensive than applying an adhesive.

An absorbent layer or strip of matting 200 is doubled and folded through a slot 202 which perforates the flexible plate 160 perpendicular to the main dimension of the plate and close to slot 170 in the first end 166 of the plate 160. The doubled matting strip 200 is therefore double-layered on both sides of the flexible plate 160. The purpose of the absorbent layer or matting strip 200 is to serve as a matrix for hardening material. The matting 200 thus comprises a rigidifying means for the anchor 60. The matting strip 200 can be made of woven fiberglass cloth, but can be made of other kinds of fibers having sufficient tensile strength and which can be woven or pressed into batts. Woven fiberglass cloth sold by the Owens Corning Fiberglass Company under the trademark WOVEN ROVING can be used. Such material can be found at many boat repair shops and at many marine and automotive body shops. The hardening material is preferably epoxy resin, as discussed below.

Protective sheets 190 are located between a matting strip 200 and the cushion sheets 180. A useful material for the protective sheets 190 is polyethylene. The purpose of the protective sheets 190 is to prevent hardening material in the matting strip 200 from contacting and having an unfavorable chemical reaction with the material of the cushion sheets 180.

The layers 160, 180, 190 and 200 of the anchor 60 together form a support 204 for supporting the rack 10 on the vehicle 20. The support 204 in its first configuration is sufficiently pliable, flexible and thin to change shape to conform to an anchoring configuration (for example, the shape shown in FIG. 8) in which the anchor 60 hardens so as to form a substantially rigid and non-pliable anchor support for the rack 10.

FIGS. 5, 6, and 7 depict the laminated construction of the anchor 60. The cushion sheets 180 surround as much of the flexible plate 160 as needed to prevent damage to the finish of the anchor site and any adjacent components such as doors or trunk lids. The flexible plate 160 itself is constructed of three plate sheets 162. Two plate sheets can also be provided, instead of three as shown in FIG. 6. However, the use of three sheets usually provides greater rigidity for the hardened anchor 60. The plate sheets 162 are not attached to each other except at the end 166 of the flexible plate 160 which contains the slot 170.

The plate sheets 162 are perforated by a plurality of holes 164. The purpose of the holes 164 is to permit hardening material to penetrate the plate sheets 162 and to spread throughout interior portions of the anchor 60.

Once the hardening material has hardened, the flexible plate sheets 162 are fixed together, providing a laminated rigid structure which has the strength properties of the combined thicknesses of the metal plates 162 plus the matting strip 200 and the hardening material. The completed anchor 60 thus has the rigidity and strength to be a good anchor, while having an anchoring configuration fitting the anchor site, as described below.

In an alternative structure of the anchor 60, the support normally provided by the plate sheets 162 can be formed solely by the matting 200 having suitable tensile strength to secure the anchor to the anchor site after the anchor hardens. Hardening material could then be added to the matting 200 in order to rigidify the anchor 60. Hardening material can be injected into the matting 200 or previously incorporated into the matting 200 at the time of manufacture to be activated later as described below.

Useful approximate dimensions for the anchor 60 are a length of 8 inches, a width of 2 inches, and a thickness of not more than ¼ inch. The matting strip 200 is approximately slightly less than 24 inches long. The strip 200 is folded once to double it and then inserted half way through the slot 202 in the flexible plate 160 and folded again at the slot 202. The total length of the flexible plate 160 contacted by the matting strip 200, on either side, is about 6 inches.

In the embodiment of the invention shown in FIG. 6, the cushion sheets 180 form approximately fifty percent of the thickness of the anchor 60, or approximately ⅛ inch in total thickness. The total thickness of the plate sheets 162 forms less than about ten percent of the thickness of the anchor 60. The remaining thickness of the anchor 60 is provided by the combined thicknesses of the matting strip 200 and the protective sheets 190.

The anchor 60 is initially flexible so that it can conform to the contours of the door jamb, hatch, trunk lid, or other component (anchor site) of the vehicle or other structure that the anchor 60 is to hook against. Thus, a user can place the anchor 60 between a door 70 and a door jamb 122 of a vehicle and simply shut the door, as shown in FIGS. 1, 3, and 3A The anchor 60, because of its flexibility, conforms to the juncture between the door and the door jamb. The anchor 60 is sufficiently thin so as not to disrupt the seals between the door and door jambs of the vehicle, thus avoiding water leaks and wind noises.

FIG. 8 shows the anchor 60 already formed into the shape it might have to assume in order to fit between a door 70 and a door jamb 122 of the vehicle. Another possible site for the anchor is the lid 110 of a trunk, as shown in FIG. 2. The anchor 60 is placed around the edge of the lid 110 and the trunk lid 110 is closed, trapping the anchor 60 between the lid of the trunk and its seat.

The anchor 60 must then be hardened so as to retain the appropriate shape. In one embodiment of the invention, epoxy resin or a similar hardening material impregnates the matting strip 200 and penetrates between the plate sheets 162 via the plate sheet holes 164. An acceptable epoxy resin is made by the Devcon Company and is sold under the trademark DEVCON Five-Minute Epoxy, in many hardware and auto supply stores. When this material is hard, the anchor 60 is permanently hardened into whatever shape the anchor 60 had at the time of hardening.

The hardening means for hardening the anchor can be provided by alternative means. Activated resin or other activated hardening material can be injected into the matting strip 200 when the anchor 60 is to be hardened. Alternatively, non-activated hardenable material, such as non-activated resin, can be added to the matting strip 200 when the anchor 60 is first constructed, and later activated so that it will cure and harden. In this case, some activating means, such as one of those illustrated by FIGS. 9 and 11, must be provided for subsequently activating the resin.

In FIG. 9, the anchor 60 is manufactured with the hardening material (e.g., resin) already impregnating the matting strip 200. This kind of hardening material hardens upon exposure to heat. In one application, the user simply dips the anchor 60 in hot water (contained in pot 210). This activates the hardening material in the anchor 60 and the material gradually becomes rigid. The anchor 60 is immediately placed in an appropriate anchor site on the vehicle, whether between a door and a door jamb, between a trunk lid and the trunk lid seat or some other location, as shown in FIGS. 1, 2, 3, and 3A. One end of the anchor is folded over a hard point or ridge of the anchor site in order to provide positive anchoring later on. The user then waits for the material in the anchor 60 to harden as it cools.

The hardening material can also be of the kind which hardens upon exposure to ultra violet (UV) light. The non-activated hardening material is pre-placed in the anchor when it is manufactured and UV light is applied to the anchor for sufficient time to harden the anchor in its anchoring configuration. This alternative has the disadvantage of not being as practical for those lacking a UV light source.

In FIG. 10, the hardening material is epoxy resin which is injected by an injection instrument such as a syringe 140 into the opening 192 in the anchor 60 between the protective sheets 190 and the cushion sheets 180. An opening 192 of about one-quarter inch can be used. As explained above, DEVCON Five-Minute Epoxy resin, which comes in a package containing two chemicals which are mixed together to create the hardening resin, can be used as the hardening material. Other hardening materials, such as those which harden upon exposure to air, can also be used. However, air-activated hardening materials tend to cure more slowly than hardening materials which are combined with a chemical curing agent. The anchor 60 is massaged to spread the resin through the holes 164 in the plates 162 (see FIG. 6) and into the fiberglass matting 200 on both sides of the plates 102. The anchor 60 is then pressed into its position on the vehicle and allowed to harden. The anchor 60 can be covered with a plastic covering, such as a bag made of polyurethane, before the anchor 60 is pressed into position on the vehicle so that excess resin does not ooze from the anchor 60 onto the vehicle when it is conformed to the anchoring configuration. After the anchor 60 hardens, the plastic covering can be peeled off the anchor 60, and any excess resin extending from the opening 192 can be cut away.

Figure 12:
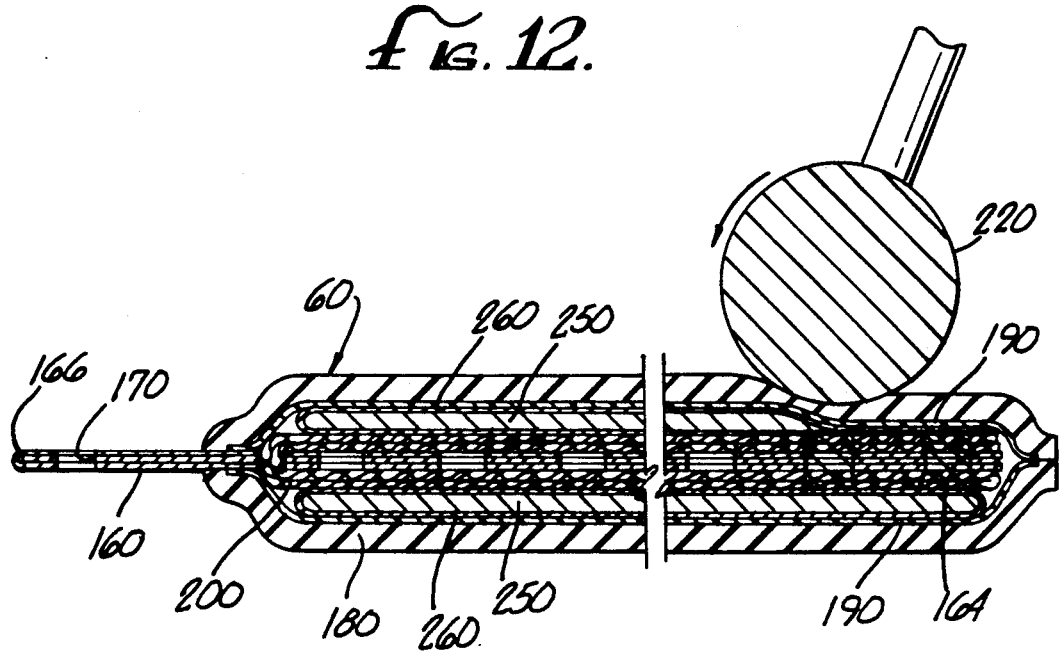
FIG. 12 is a cross-sectional view of the anchor and a roller as shown in FIG. 11 taken along line 12—12 in FIG. 11.

In FIG. 11, an anchor 60 is illustrated with the same layers of material as the anchor 60 shown in FIG. 6, except the absorbent layer 200 is impregnated with a non-activated epoxy resin or other hardening material when the anchor 60 is manufactured. As is best seen in FIG. 12, bladders 260 containing a curing agent such as a catalyst hardening chemical 250 are placed on either side of the anchor 60 between the doubled matting strip 200 and the protective sheet 190. Later, a roller 220 is pressed against the anchor 60 and rolled back and forth in order to burst the bladder 260 on either side of the anchor 60. This releases the curing agent 250 from the bladders 260 so that it mixes with the resin in the matting strip 200, thereby forming activated resin or hardening material which eventually hardens the strip 200. The user then places the anchor 60 into its position on the vehicle or other structure and allows the anchor 60 to harden. The kind of curing agent that can be injected, as described above in connection with FIG. 10, can be used. For example, the catalyst hardening chemical included with the product sold under the name DEVCON Five-Minute Epoxy resin can be placed in the bladder 260 with the non-hardened, non-activated resin pre-placed in the matting strip 200.

No matter how activated resin is introduced into the anchor 60, the process is essentially the same: the anchor 60 hardens after the anchor is shaped to conform to the selected anchoring site. This results in an anchor that is suitably shaped to the appropriate anchoring position on the vehicle.

The invention, therefore, provides an anchor that is initially flexible, conforms to any vehicle seal and door configuration, permanently hardens in the desired shape easily and quickly, is strong enough to securely hold the utility rack to a vehicle, is streamlined and does not leak water under wet weather conditions, is non-destructive and does not require permanent installation means in the vehicle, is easily removed or attached to the vehicle, is inexpensive to manufacture, offers theft resistance, and is easily attached to the rack.

Thus, an anchor for a utility rack for a vehicle is provided. Those skilled in the art will appreciate that an anchor according to the present invention may be designed using other structures. The claims, therefore, should be regarded as including equivalent constructions as do not depart from the spirit and the scope of the invention, which is intended to be defined by the appended claims.

What is claimed, is:

1. An anchor for detachably securing a utility rack to an anchor site on a structure, the anchor comprising:
   (a) a plate sufficiently pliable, flexible, and thin that the anchor can be conformed from a first configuration to an anchoring configuration that fits snugly in the anchor site;
   (b) attaching means for attaching the utility rack to the anchor; and
   (c) rigidifying material integral with the plate, the rigidifying material being pliable and flexible and capable of becoming substantially rigid to maintain the plate in its anchoring configuration.

2. The anchor according to claim 1 wherein the plate comprises a plurality of sheets sandwiched together.

3. The anchor of claim 1 having a thickness of not more than ¼ inch.

4. The anchor according to claim 1 further comprising cushioning means comprising a sheet of soft, resilient material proximate to the plate for cushioning the anchor to avoid damage to the structure.

5. The anchor according to claim 4 wherein the cushioning means is made of a sheet of neoprene synthetic elastomer.

6. The anchor according to claim 1 wherein the attaching means comprises a slot formed in the plate.

7. The anchor of claim 1 further comprising activating means for rendering the rigidifying material substantially rigid.

8. An anchor for detachably securing a utility rack to an anchor site on a structure, the anchor comprising:
(a) a plate sufficiently pliable, flexible, and thin that the anchor can be conformed from a first configuration to an anchoring configuration that fits snugly in the anchor site;
(b) attaching means for attaching the rack to the anchor; and
(c) rigidifying means for rendering the anchor substantially rigid and non-pliable in its anchoring configuration, the rigidifying means comprising at least one layer of absorbent material proximate to the plate, and a hardening material absorbable by the absorbent material and curable into a rigid, non-pliable state.

9. The anchor of claim 8 wherein the hardening material cures when heated.

10. The anchor of claim 8 wherein the hardening material cures upon application of UV light.

11. The anchor of claim 8 wherein the hardening cures when combined with a curing agent.

12. The anchor of claim 11 wherein the hardening opening in the anchor sized for placement of an injection instrument for injecting the hardening material into the absorbent material.

13. The anchor of claim 11 further comprising burstable bladder adjacent the absorbent layer, the bladder containing the curing agent so that the hardening material cures into the rigid, non-pliable state when the bladder bursts releasing the curing agent from the bladder to combine with the hardening material.

14. The anchor of claim 8 wherein the hardening material is absorbed by the absorbent material.

15. The anchor according to claim 8 further comprising a cushioning means made of a sheet of soft, resilient material covering the absorbent material and the plate for avoiding damage to the structure.

16. The anchor according to claim 15 further comprising a protective sheet between the absorbent material and the cushioning means for preventing the hardening material from chemically reacting with the cushioning means.

17. The anchor according to claim 8 further comprising at least one hole in the plate penetrating the plate in order to permit passage of the hardening material through the plate to permeate the absorbent material.

18. The anchor according to claim 8 in which the plate is made of at least one sheet of stainless steel.

19. The anchor according to claim 8 in which the plate is made of at least one sheet of aluminum alloy.

20. The anchor according to claim 8 in which the plate is made of at least one sheet of aromatic polyamide fiber material.

21. An anchor for detachably securing a utility rack to an anchor site on a structure, the anchor comprising:
(a) a support comprising a plurality of layers, the support being sufficiently pliable and flexible that it can be conformed from a first configuration to an anchoring configuration that fits snugly in the anchor site, the layers comprising:
 (i) an internal plate of strong, cut-resistant material;
 (ii) an absorbent layer surrounding the internal plate;
 (iii) a cushioning layer surrounding the plate and the absorbent layer, the cushioning layer comprising soft, resilient material; and
 (iv) between the cushioning layer and the absorbent layer, a protective layer for separating the absorbent layer from the cushioning layer;
(b) attaching means for attaching the support to the rack; and
(c) hardening material absorbable by the absorbent layer and curable for rendering the support rigid and non-pliable in its anchoring configuration.

22. The anchor according to claim 21 wherein the plate comprises a plurality of plate sheets.

23. The anchor according to claim 21 further comprising an opening in the cushioning and protective layers sized for placement of an injection instrument for injecting the hardening material into the absorbent layer.

24. The anchor according to claim 24 wherein the hardenable material is pre-placed in the absorbent layer and the anchor further comprises a bladder adjacent the absorbent layer and filled with a curing agent so that the anchor becomes substantially rigid and non-pliable after the bladder bursts releasing the curing agent from the bladder to combine with the hardening material.

25. The anchor according to claim 21 wherein the plate is perforated by at least one hole to permit hardening material to pass through the plate to permeate the absorbent material.

26. A method for forming an anchor for securing a utility rack to an anchor site for a structure, the method comprising the steps of:
(a) selecting an anchor comprising:
 (i) a plate sufficiently pliable, flexible, and thin that the anchor can be conformed from a first configuration into an anchoring configuration that fits snugly in the anchor site;
 (ii) attaching means for attaching the utility rack to the anchor; and
 (iii) rigidifying material integral with the plate, the rigidifying material being pliable and flexible and capable of becoming substantially rigid to maintain the plate in its anchoring configuration;
(b) conforming the anchor from the first configuration to the anchor configuration so that the anchor fits snugly into the anchor site; and
(c) hardening the anchor in its anchoring configuration by activating the rigidifying material so that the anchor is substantially rigid and non-pliable.

27. The method of claim 26 wherein the rigidifying means of the selected anchor comprises activated hardening material and an absorbent layer adjacent the plate, and wherein the step of hardening the anchor comprises injecting the activated hardening material into the absorbent layer.

28. The method of claim 26 wherein the rigidifying means of the selected anchor comprises an absorbent layer adjacent the plate, non-activated hardening material pre-placed in the absorbent layer, and a burstable bladder filled with a curing agent adjacent the absorbent layer, and wherein the step of hardening comprises bursting the bladder thereby releasing the curing agent to combine with and cure the hardening material.

29. The method according to claim 26 wherein the structure has access means for opening and closing the structure and a seat for receiving the access means when the access means is closed, the anchor site being formed between the access means and the seat, and wherein the step of conforming the anchor comprises closing the access means with the anchor pre-placed in the anchor site.

30. An anchor for detachably securing a utility rack to an anchor site on a structure, the anchor comprising:
(a) a support comprising a plurality of layers, the support being sufficiently pliable and flexible that it can be conformed from a first configuration to an anchoring configuration that fits snugly in the anchor site, the layers comprising:
(i) an internal plate of strong, cutresistant material;
(ii) surrounding the internal plate, an absorbent layer;
(iii) a cushioning layer surrounding the plate and the absorbent layer, the cushioning layer comprising soft, resilient material; and
(iv) between the cushioning layer and the absorbent layer, a protective layer for separating the absorbent layer from the cushioning layer;
(b) attaching means for attaching the support to the rack;
(c) hardening material pre-placed in the absorbent layer;
(d) a bladder adjacent the absorbent layer and filled with a curing agent so that when the bladder bursts the curing agent is released to combine with the hardening material and the hardening material is activated to render the support rigid and non-pliable in its anchoring configuration.

31. A kit for forming an anchor for detachably securing a utility rack to an anchor site on a structure, the kit comprising:
(a) a device comprising:
(i) a plate sufficiently pliable, flexible, and thin that the anchor can be conformed from a first configuration to an anchoring configuration that fits snugly in the anchor site;
(ii) attaching means for attaching the rack to the anchor; and
(iii) rigidifying means for rendering the anchor substantially rigid and non-pliable in its anchoring configuration, the rigidifying means comprising at least one layer of absorbent material proximate to the plate; and
(b) a hardening material absorbable by the absorbent material and curable into a rigid, non-pliable state.

32. The kit of claim 31 further comprising a curing agent for combination with the hardening material to cure the hardening material into its rigid, non-pliable state.

33. The kit of claim 31 further comprising an injection instrument for injecting the hardening material into the anchor.

34. A utility rack for attachment to an anchor site on a structure, the utility rack comprising:
(a) a carrier bar;
(b) an anchor for attaching the utility rack to the anchor site, the anchor comprising:
(i) a plate sufficiently pliable, flexible, and then that the anchor can be conformed from a first configuration to an anchoring configuration that fits snugly in the anchoring site;
(ii) attaching means for attaching the utility rack to the anchor; and
(iii) rigidifying material integral with the plate, the rigidifying material being pliable and flexible and capable of becoming substantially rigid to maintain the plate in its anchoring configuration.

35. The utility rack of claim 34 wherein the rigidifying means comprises at least one layer of absorbent material proximate to the plate, and a hardening material absorbable by the absorbent material and curable into a rigid, non-pliable state.

36. The utility rack of claim 35 wherein the hardening material cures when combined with a curing agent and the anchor further comprises an opening in the anchor sized for placement of an injection instrument for injecting the hardening material combined with the curing agent into the absorbent material.

37. The anchor of claim 35 wherein the rigidifying means comprises the hardening material preplaced in the absorbent layer in a non-activated state and the anchor further comprises a burstable bladder adjacent the absorbent layer, the bladder containing curing agent so that when the bladder bursts thereby releasing the curing agent to combine with the hardening material, the hardening material cures into the rigid, non-pliable state.

38. The utility rack of claim 34 further comprising connecting means attached to the carrier bar for connecting the carrier bar to the attaching means.

39. A utility rack attached to an anchor site on a vehicle, the attached utility rack comprising:
(A) a carrier bar;
(B) a hardened anchor attached to the carrier bar and fitted snugly and securely in the anchor site, the anchor comprising:
(i) a support comprising:
(a) an internal plate of strong, cut-resistant material;
(b) an absorbent layer surrounding the internal plate;
(c) a cushioning layer surrounding the plate and the absorbent layer, the cushioning layer comprising soft, resilient material; and
(d) between the cushioning layer and the absorbent layer, a protective layer for separating the absorbent layer from the cushioning layer;
(ii) attaching means for attaching the support to the rack; and
(iii) hardening material absorbed in the absorbent layer and cured into a rigid, non-pliable state.

40. The utility rack of claim 34 or 39 wherein the attaching means comprises a slot formed in the plate.

41. The attached utility rack of claim 40 wherein the connecting means is a strap passing through the slot.

42. The utility rack of claim 39 further comprising connecting means attached to the carrier bar for connecting the carrier bar to the attaching means.

43. The anchor of claim 42 wherein the activating means renders the rigidifying material permanently rigid.

* * * * *